(12) United States Patent
Gerlach

(10) Patent No.: US 6,312,238 B1
(45) Date of Patent: Nov. 6, 2001

(54) HYDRAULICALLY RETRACTABLE HYDRAULIC MOTOR

(75) Inventor: C. Richard Gerlach, Pleasanton, TX (US)

(73) Assignee: Rineer Hydraulics, Inc., San Antonio, TX (US)

( * ) Notice: Subject to any disclaimer, the term of this patent is extended or adjusted under 35 U.S.C. 154(b) by 0 days.

(21) Appl. No.: 09/504,988

(22) Filed: Feb. 15, 2000

(51) Int. Cl.[7] ............................. F01C 21/00; F03C 2/00; F16D 19/00; F04B 35/00

(52) U.S. Cl. ..................... 418/69; 417/319; 192/85 A; 92/31

(58) Field of Search .................. 60/435, 436; 417/319; 418/69; 192/85 A, 86, 85 CA, 96; 92/29, 31, 32, 33; 91/41, 44, 45

(56) References Cited

U.S. PATENT DOCUMENTS

| | | |
|---|---|---|
| 2,408,181 | 9/1946 | Simonton . |
| 2,502,234 * | 3/1950 | Rosen ..................................... 60/435 |
| 2,653,577 | 9/1953 | Jenny ................................. 192/96 X |
| 2,808,033 | 10/1957 | Geier et al. . |
| 2,906,383 | 9/1959 | Gabriel . |
| 2,970,442 | 2/1961 | Taylor . |
| 3,042,163 | 7/1962 | Lapsley . |
| 3,046,802 | 7/1962 | Cupedo .............................. 192/96 X |
| 3,094,845 | 6/1963 | Mallofre ............................. 192/96 X |
| 3,125,202 | 3/1964 | Hill . |
| 3,133,476 | 5/1964 | Geyer ................................. 192/96 X |
| 3,264,949 | 8/1966 | Dietlin ............................... 192/96 X |
| 3,319,925 | 5/1967 | Kojima et al. ...................... 192/96 X |
| 3,444,972 | 5/1969 | Carstensen et al. . |
| 3,508,472 | 4/1970 | Hartwick, Jr. . |
| 3,513,754 | 5/1970 | John . |
| 3,908,511 | 9/1975 | Spiantini et al. . |
| 3,989,223 * | 11/1976 | Burkhardt et al. ..................... 251/58 |
| 4,152,972 | 5/1979 | Fylling ............................... 192/96 X |
| 4,505,185 * | 3/1985 | Jacobs ............................... 417/319 X |
| 4,553,914 * | 11/1985 | Noell et al. ............................. 418/69 |
| 5,099,749 | 3/1992 | Darish ................................ 192/96 X |
| 5,241,895 | 9/1993 | Weyer ................................. 192/96 X |
| 5,261,801 | 11/1993 | Stone ................................. 192/96 X |
| 5,367,943 | 11/1994 | Stoll et al. .......................... 192/96 X |
| 5,577,433 | 11/1996 | Henry . |
| 5,899,307 | 5/1999 | Zaun et al. . |

\* cited by examiner

Primary Examiner—John E. Ryznic

(57) ABSTRACT

A method and apparatus for hydraulically engaging and disengaging a hydraulic motor comprising a rotor and a stator.

2 Claims, 3 Drawing Sheets

HYDRAULICALLY RETRACTABLE HYDRAULIC MOTOR

BACKGROUND OF THE INVENTION

The present invention is a method and apparatus for hydraulically disengaging an output shaft of a hydraulic motor. In particular, the hydraulic motor includes a longitudinal movable output shaft which may be moved hydraulically for allowing the driven mechanism to rotate without interference from the hydraulic motor.

In hydraulic equipment, and especially mobile hydraulic equipment, it is often necessary and/or desirable to disengage the hydraulic motor from the mechanism it is driving so as to free wheel the mechanism. An example of this is a hydraulic motor which is connected to the wheels of a mining machine and used to propel the mining machine. When it becomes necessary to tow the mining machine the hydraulic motor must be disengaged from the drive train so the machine will roll freely. Another example is a scissor-lift used to load and unload aircraft. It is typically driven with a hydraulic motor connected to its drive train. When this vehicle requires towing, it is again necessary to disengage the motor from the drive train. Another example is a knuckle-boom loader which is used in the harvesting of timber. When it is in the woods, it is propelled by a hydraulic motor connected to its drive train. When it is transported to another job site, the hydraulic motor must be disconnected to allow the knuckle-boom loader to be towed.

Yet still another example is when a hydraulic motor is used to drive a winch. It is often necessary to disengage the motor in order to free wheel cable off the winch. Disengaging the hydraulic motor in the above examples is often accomplished by unbolting and physically removing the motor, building an elaborate slide which will slide the motor out of engagement, or using an expensive clutch between the motor and the drive train which can disengage the motor. Such disengagement may also be accomplished by hand, as set forth in U.S. Pat. No. 5,261,801. However, the art lacks a means of hydraulically engaging and disengaging a hydraulic motor.

SUMMARY OF THE INVENTION

An object of the present invention is to provide an automated means of engaging and disengaging a hydraulic motor from an external rotary load. Another object of the invention is to provide a means of easily retrofitting prior art hydraulic motors with automated means of engaging and disengaging the motor. Another object of the present invention is to provide a non-torque bearing hydraulic actuator.

There is provided a retractable shaft motor assembly comprising an axially moveable drive shaft, a retractable rod in communication with the drive shaft, an actuator in communication with the retractable rod, and a motor positioned between the drive shaft and the actuator. The actuator rod may be fixedly connected to the drive shaft. The actuator rod may be rotatably connected to the actuator. The actuator rod may be slidably positioned along an axis of the motor. The retractable actuator rod may be non-torque-bearing. The motor may be a hydraulic motor.

There is also provided a hydraulically retractable shaft motor comprising a motor, the motor having a longitudinal axis, an axially moveable output shaft, the output shaft having an interface for selectively engaging the motor, and an axial hydraulic actuator assembly connected to the output shaft. The hydraulic actuator assembly may comprise a cylinder, a piston, and an actuator rod. The motor may be a hydraulic motor comprising a rotor and a stator, and the hydraulic actuator assembly may comprise a non-torque bearing actuator rod. The actuator rod may be non-torque bearing. The actuator rod may be rotatably connected to the piston. The motor and the output shaft may have longitudinal coacting splines.

There is also provided a method of disengaging a hydraulic motor having a rotor, a stator, and a longitudinally moveable output shaft in selective communication with an external rotary load, comprising hydraulically and longitudinally moving, the output shaft relative to the rotor whereby the output shaft disengages from the external load.

DETAILED DESCRIPTION OF THE PREFERRED EMBODIMENT

Figure 1:
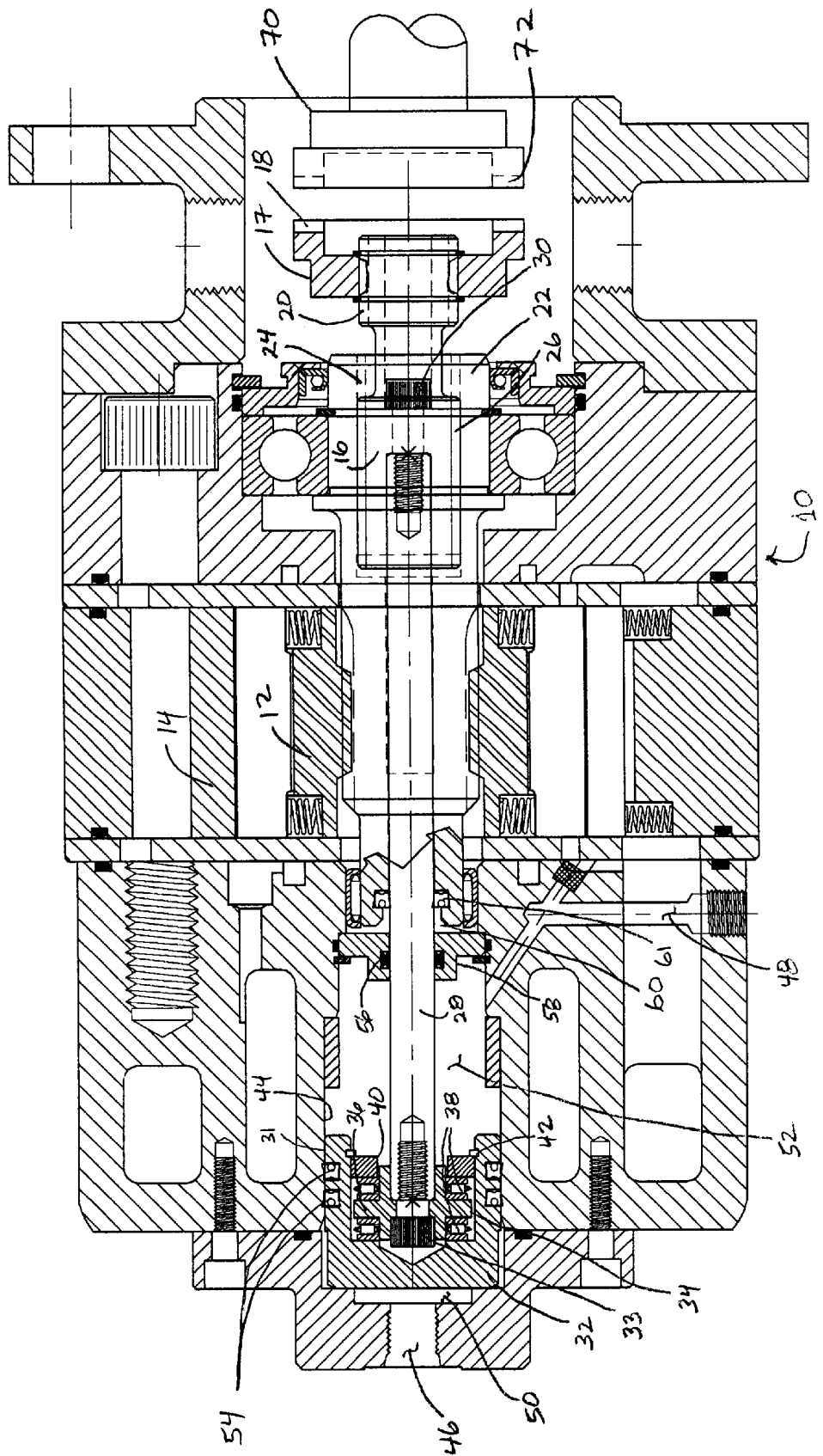
FIG. 1 is a cross-sectional view of a disengaged, hydraulically-engageable hydraulic motor exemplary of the present invention.

FIG. 1 depicts a cross-sectional view of a disengaged hydraulically engageable hydraulic motor 10 exemplary of the present invention. The hydraulic motor 10 comprises a rotor 12 and stator 14. Output shaft 16 exhibits a dog-face clutch 17 axially and rotatably attached to retractable spline portion 20. Motor shaft 22 is integral with rotor 12 and exhibits splines 24. Splines 24 slideably coact with splines 26 of output shaft 16. Actuator rod 28 is fixed to output shaft 16 by bolt 30 and, whereby actuator rod 28 rotates with output shaft 16.

Actuator rod 28, and in turn output shaft 16, are moved axially by actuator piston assembly 31. Actuator piston assembly 31 comprises actuator piston 32, which rotatably communicates with actuator rod 28 via thrust flange assembly 34. Thrust flange assembly 34 comprises thrust flange 36, thrust bearings 38, thrust washer 40, and snap ring, 42. Thrust flange assembly 34 enables actuator rod 28 to rotate relative to piston 32. Thrust flange assembly 34 is connected to the actuator rod 28 by bolt 33.

Actuator piston assembly 31 is driven axially within cylinder 44 by alternating hydraulic fluid pressures through hydraulic fluid passageways 46 and 48. Hydraulic fluid passageway 46 injects hydraulic fluid into and bleeds hydraulic fluid from chamber 50, and hydraulic fluid passageway 48 injects hydraulic fluid into and bleeds hydraulic fluid from chamber 52. Actuator piston seals 54 prevent communication of hydraulic fluid between chamber 50 and chamber 52.

Actuator rod main rotary seal 56 in seal plate 58 prevents communication of hydraulic fluid from the front hydraulic cavity 52 to the motor case 60. Actuator rod seal 61 prevents leakage of case fluid.

Actuator piston assembly 31 and actuator rod 28 selectively drive output shaft 16 and attached dog-face clutch 17 and dog teeth 18 in and out of engagement with dog-face clutch teeth 72 of load shaft 70. Once engaged, motor shaft 22 rotates load shaft 70. Actuator rod 28 is not imparted the full torque of the motor shaft 22, because the output shaft 16 communicates directly with the motor shaft 22, and because actuator rod 28 rotates relative to the actuator piston assembly 31.

To engage hydraulic motor 10 of the present invention, hydraulic fluid is injected through hydraulic fluid passageway 46 into chamber 50, while simultaneously venting any hydraulic fluid in chamber 52 through passageway 48, whereby shaft 16 forces dog-face clutch 17 into engagement with dog-face clutch 70. To disengage the hydraulic motor 10, the foregoing hydraulic fluid flow is reversed.

Figure 2:
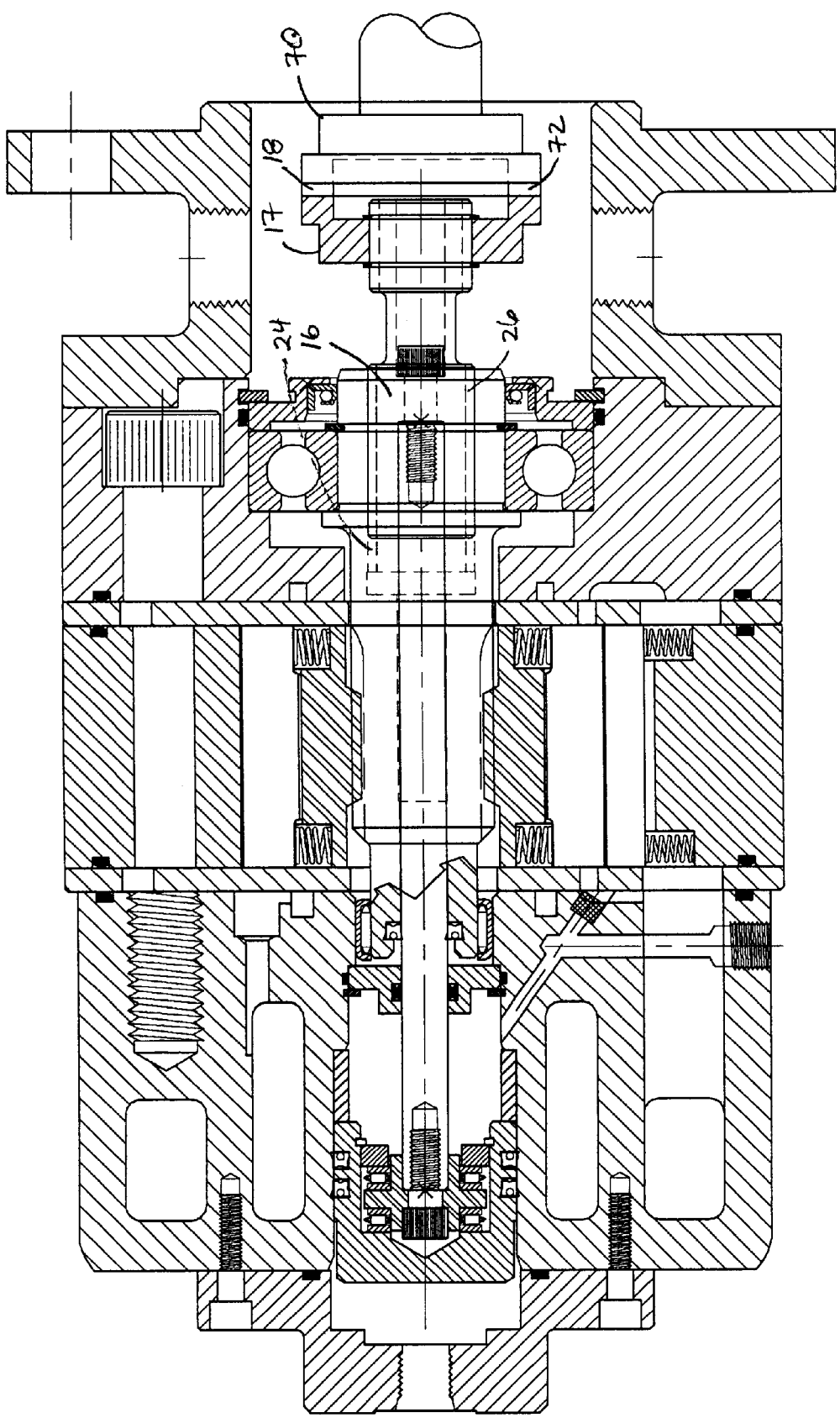
FIG. 2 is a cross-sectional view of an engaged, hydraulically-engageable hydraulic motor exemplary of the present invention.

FIG. 2 depicts the motor of FIG. 1 in an engaged position, with splines 24 and 26 coacting with each other, and dog-face clutch teeth 18 engaged with dog-face clutch teeth 72.

Figure 3:
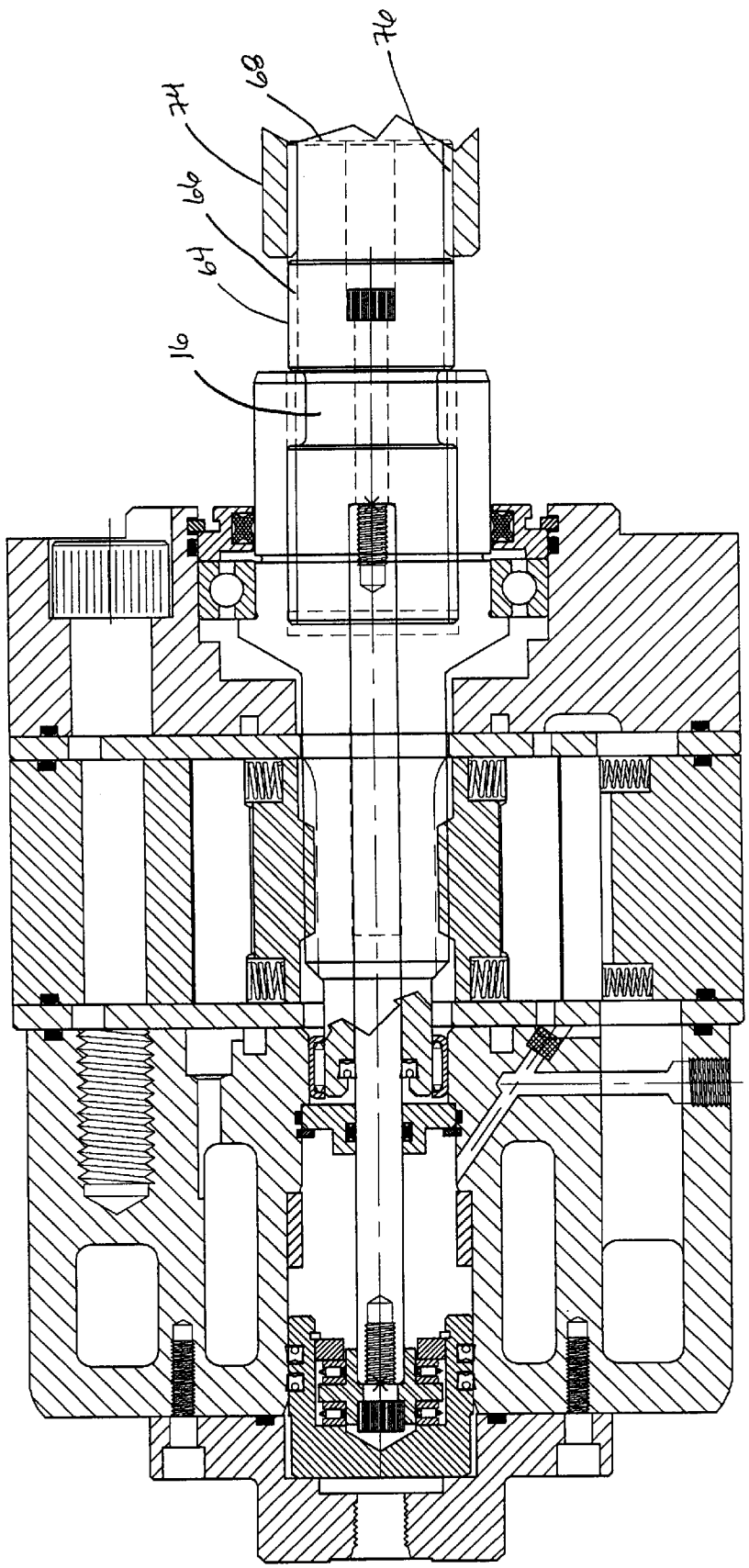
FIG. 3 is a cross-sectional view of an alterative embodiment of the present invention.

FIG. 3 depicts an alternative embodiment of the present invention, in which output shaft 16 comprises an engagement mechanism 64 exhibiting external splines 66. Engaged position 68 is shown in shadow. External load shaft 74 exhibits internal splines 76 which are selectively engageable with splines 66. The engaged position of splines 66 with splines 76 is shown in shadow by position 68.

The foregoing are merely examples of the invention. One of ordinary skill in the art will appreciate that several embodiments of the invention may be devised within the scope of the claims.

What is claimed is:

1. A retractable shaft motor assembly comprising:

an axially moveable drive shaft;

actuator rod fixedly connected to the drive shaft;

a hydraulic actuator in communication with the actuator rod; and a motor positioned between the drive shaft and the hydraulic actuator.

2. A retractable shaft motor assembly comprising:

an axially moveable drive shaft;

an actuator rod rotatably connected to the drive shaft;

a hydraulic actuator in communication with the actuator rod; and a motor positioned between the drive shaft and the hydraulic actuator.

* * * * *